United States Patent
Fedders (10) Patent No.: US 12,139,980 B2
(45) Date of Patent: Nov. 12, 2024

(54) DECK ASSEMBLIES FOR VIBRATORY SEPARATORS

(71) Applicant: SCHLUMBERGER TECHNOLOGY CORPORATION, Sugar Land, TX (US)

(72) Inventor: John Fedders, Union, KY (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 311 days.

(21) Appl. No.: 17/757,804

(22) PCT Filed: Dec. 17, 2020

(86) PCT No.: PCT/US2020/065578
§ 371 (c)(1),
(2) Date: Jun. 21, 2022

(87) PCT Pub. No.: WO2021/127157
PCT Pub. Date: Jun. 24, 2021

(65) Prior Publication Data
US 2022/0356771 A1    Nov. 10, 2022

Related U.S. Application Data

(60) Provisional application No. 62/950,895, filed on Dec. 19, 2019.

(51) Int. Cl.
*E21B 21/06* (2006.01)
*B01D 33/03* (2006.01)

(52) U.S. Cl.
CPC .......... *E21B 21/065* (2013.01); *B01D 33/03* (2013.01)

(58) Field of Classification Search
CPC .................................................. E21B 21/065
See application file for complete search history.

(56) References Cited

U.S. PATENT DOCUMENTS

| 4,288,310 A | 9/1981 | Knight |
| 4,288,320 A | 9/1981 | Wilson |
| 6,079,568 A | 6/2000 | Loshe |

(Continued)

FOREIGN PATENT DOCUMENTS

| CA | 3007701 A1 | 12/2018 |
| EP | 1998904 B1 | 10/2012 |

(Continued)

OTHER PUBLICATIONS

Search Report and Written Opinion of International Patent Application No. PCT/US2020/065578 on Apr. 21, 2021; 13 pages.

(Continued)

*Primary Examiner* — Jason Y Ko
(74) *Attorney, Agent, or Firm* — Jeffrey D. Frantz (57) ABSTRACT

Deck assemblies for vibratory separators are provided. In accordance with an implementation, an upper deck assembly for use with a vibratory separator having a basket and a lower deck, the upper deck assembly includes a pair of side rails, a filter screen, and a support. The side rails are couplable to inward facing surfaces of the basket and the filter screen is supportable by the side rails. The support extends from the filter screen and is configured to engage the lower deck or a support surface of the vibratory separator and provide support for the filter screen across a width thereof.

24 Claims, 6 Drawing Sheets

(56) References Cited

U.S. PATENT DOCUMENTS

| | | |
|---|---|---|
| 9,358,583 B1 | 6/2016 | Kahn |
| 10,046,365 B2 | 8/2018 | McKeown |
| 2004/0074816 A1 | 4/2004 | Seyffert et al. |
| 2014/0054216 A1 | 2/2014 | Burnett |
| 2015/0375266 A1 | 12/2015 | Cady |
| 2019/0240700 A1 | 8/2019 | Pomerleau |

FOREIGN PATENT DOCUMENTS

| | | | |
|---|---|---|---|
| GB | 944950 A | 12/1963 | |
| RU | 123350 U1 | 12/2012 | |
| RU | 2676103 C2 | 12/2018 | |
| RU | 186820 U1 | 2/2019 | |
| SU | 1456251 A1 | 2/1989 | |
| WO | 2004035234 A1 | 4/2004 | |

OTHER PUBLICATIONS

International Preliminary Report on Patentability of International Patent Application No. PCT/US2020/065578 dated Jun. 30, 2022, 9 pages.
Substantive Exam Report issued in Saudi Arabia Patent Application No. 522432695 dated Mar. 28, 2023, 12 pages.
First Office Action issued in Chinese Patent Application No. 202080084808.6 dated Mar. 6, 2024, 14 pages.
Office Action issued in Russian Patent Application No. 2022119276 dated Mar. 29, 2024, 15 pages.
Second Substantive Exam Report issued in Saudi Arabia Patent Application No. 522432695 dated Jul. 24, 2024, 10 pages.

DECK ASSEMBLIES FOR VIBRATORY SEPARATORS

CROSS-REFERENCE TO RELATED APPLICATIONS

This application is a National Stage Entry of PCT/US2020/065578, filed Dec. 17, 2020, which claims priority to U.S. Provisional Patent Application No. 62/950,895, filed Dec. 19, 2019, the content of which is incorporated by reference herein in its entirety and for all purposes.

BACKGROUND

Separation equipment is used in various industries to facilitate separation of different sized or type components. A separation equipment unit commonly employed in the oilfield industry is a vibratory separator or shale shaker. A shale shaker, which has an angled table and a generally perforated filter screen bottom, has a feed end and a discharge end. In an effort to separate solids, such as cuttings, entrained in oilfield drilling fluid, or mud, from liquid that is needed to lubricate and cool drill bits and remove solids from well bores, shale shakers operate as sieve-like tables. Returning drilling fluid recovered from the well bore flows into the feed end of the shale shaker. A combination of the angled table and vibratory motion imparted to the table serves to cause fluid and smaller particulates to fall through the filter screen and larger particulates to remain on top of the filter screen but advance toward the discharge end, where they fall off the shale shaker. Depending on the dimensions of the shale shaker, a plurality of filter screens may be used.

Shale shakers include a basket in which the filter screens are positioned. Shale shakers may have a single, dual, triple, or quad deck configuration. To support the additional decks in the dual, triple, and quad configurations, known shale shakers include large support structures that span a width of the basket. Because of the large size of these support structures, adding the support structure to a single deck shale shaker to support a second deck is a costly and time-consuming process.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the articles "a" and "an" are intended to have their ordinary meanings in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The implementations disclosed herein are directed toward retrofit assemblies that allow vibratory separators such as a single deck vibratory separator to add one or more additional decks (e.g., an upper deck assembly) without the inclusion of large support structures. As a result, the disclosed implementations reduce the time and cost of changing a vibratory separator between a single deck configuration to a multiple deck configuration.

The example retrofit assemblies disclosed herein include supports that are used to support the filter screen(s) within the basket of a vibratory separator. To support an upper deck within the basket, the supports are removably or integrally coupled to an upper filter screen and extend downward to abut a lower filter screen or another support structure of the separator. In some implementations, the supports are inserted into corresponding cavities formed in a lower surface of the upper deck. However, other arrangements are contemplated. For example, the supports may be hingeably coupled to the lower surface of the upper deck and shiftable between an extended position where longitudinal axes of the supports are positioned approximately perpendicularly to the lower surface of the upper deck and a retracted position where the longitudinal axes are positioned approximately parallel to the lower surface of the upper deck.

Regardless of how the supports are coupled to the upper deck, vibratory separators produced in accordance with the disclosed examples may include inwardly extending side rails that are configured to support sides of the upper deck while the example supports support the upper deck across its width. The vibratory separators may be sold without the side rails and, thus, the side rails may be attached to the vibratory separator when retrofitting the vibratory separators for use with the examples disclosed herein. These side rails do not span the width of the basket of the vibratory separator and are easily installable, thereby allowing single-deck vibratory separators to be easily converted to a configuration having two or more decks. While the following disclosure describes adding an upper deck assembly above a lower deck, it should be understood that the following disclosure can be carried out multiple times to create configurations having three or more decks.

Figure 1:
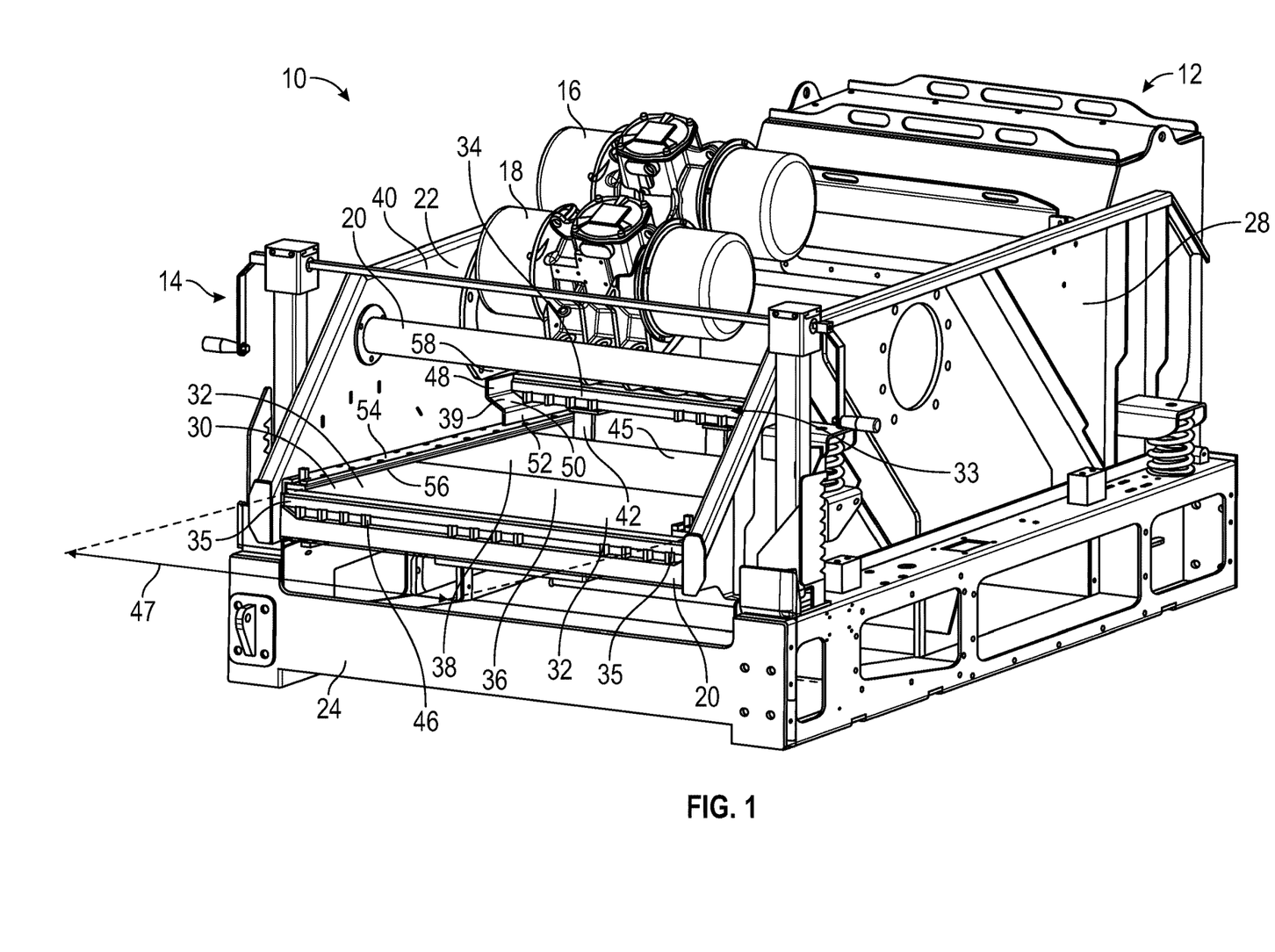
FIG. 1 illustrates an example vibratory separator in accordance with a first example of the present disclosure.

FIG. 1 illustrates an example vibratory separator 10 in accordance with a first example of the present disclosure having an inlet end 12, an outlet or discharge end 14, and a plurality of force generators 16, 18 coupled to a cross-frame member 20 of the separator 10. However, the location of the force generators 16, 18 may be different from the locations depicted in the separator 10 shown in FIG. 1, depending on the desired arrangement for a given separator 10. For instance, one or more of the force generators 16, 18 may be coupled to a sidewall 22 of the separator 10.

The separator 10 includes a base 24 and a basket 28 coupled to the base 24 and configured to hold a lower deck 30 including one or more filter screens 32 and an upper deck assembly 33 including an upper deck 34, which includes one or more of the filter screens 32. The filter screens 32 are rectangular and have substantially parallel sides 35 and feed and discharge ends 36, 38 that abut one another to form the respective lower and upper decks 30, 34 that extend between the inlet end 12 and the outlet end 14 of the separator 10.

Advantageously, the upper deck assembly 33 allows separators such as the separator 10 of FIG. 1 to be easily modified by adding one or more additional decks. In the implementation shown, the upper deck assembly 33 includes a pair of side rails 39 that are coupled to inward facing surfaces 40 of the basket 28, the filter screens 32 having sides 35 that are supported by the side rails 39, and a plurality of supports 42 that extend from the filter screen(s) 32 of the upper deck assembly 33 and engage the lower deck 30 or a support surface of the separator 10. In some implementations, the lower deck 30 includes the filter screens 32 and a spacer, sometimes referred to as a bar blank, positioned between the filter screens 32. The spacer may include protrusions to break up the solids flowing across the filter screen 32 and/or may include indentations against which the supports 42 can seat. In such implementations, the supports 42 can engage the spacer of the lower deck 30 or any other surface. While the separator 10 is shown including the side rails 39, the separator 10 may not include the side rails 39 when manufactured and/or sold. Thus, the side rails 39 may be sold as an after-market product and attached to the separator 10 for use with the examples disclosed herein. However, the separator 10 may be provided with the side rails 39. The supports 42 provide support for the filter screens 32 across a width 47 of the filter screen 32. As shown, the filter screens 32 of the upper deck 34 are supported by the side rails 39 and the supports 42 and the filter screens 32 of the lower deck 30 rest on and are supported by the cross-frame member 20 of the separator 10.

The filter screens 32 of the lower deck 30 may include openings 45 that extend at least partially through the filter screen 32 and receive the supports 42. The openings 45 can be cut though mesh of the filter screens 32 or, alternatively, the filter screens 32 may be formed with the openings 45 therein. When the openings 45 are provided, the supports 42 may rest on a frame 46 of the filter screen 32 or on the cross-frame member 20 of the separator 10. Alternatively, the openings 45 may extend entirely through the corresponding filter screen 32 such that the support 42 extending therethrough can rest on the cross-frame member 20 or the opening 45 may be omitted.

Referring now to the side rails 39, the side rails 39 extend along a depth of the basket 28 and are aligned with one another across the basket 28. In the implementation shown, the side rails 39 are S-shaped and include an upper wall 48 coupled to the side wall 22 of the basket 28, a tapered wall 50 against which the filter screen 32 is seated, and a lower wall 52 that is inwardly offset from the upper wall 48 and may rest against an upper retainer 54 of the separator 10 that is used to retain an actuator 56. The actuator 56 may be used to clamp the lower deck 30 against the cross-frame member 20 to hold the lower deck 30 in place. Above the side rails 39, a wedge bracket 58 is coupled to the inward facing surfaces 40 of the side walls 22 and extends into the basket 28 to allow a wedge (not shown) to be inserted into the space between the wedge bracket 58 and the filter screen(s) 32 of the upper deck assembly 33 to hold the filter screen(s) 32 of the upper deck assembly 33 in place. In other implementations, one or more actuators may be used to hold the filter screen(s) 32 of the upper deck 33 in place.

Figure 2:
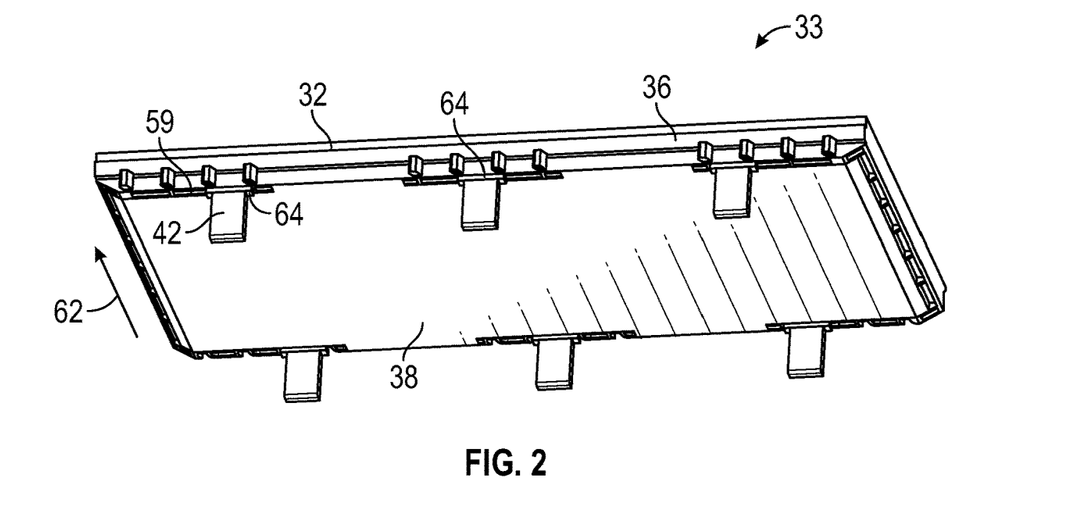
FIG. 2 illustrates a bottom isometric view of a portion of an upper deck assembly that can be used with the separator of FIG. 1.

FIG. 2 illustrates a bottom isometric view of a portion of the upper deck assembly 33 that can be used with the separator 10 of FIG. 1. In the implementation shown, the filter screen 32 includes a plurality of downwardly extending openings 59 and each of the supports 42 includes an upper plug portion 44 (the upper plug portion 44 is more clearly shown in FIG. 3) that is inserted into the corresponding opening 59 of the filter screen 32.

The filter screen 32 is shown as having three supports 42 inserted in corresponding openings 59 along each of the feed end 36 and the discharge end 38. However, another number of supports 42 may be included such as, for example, two supports 42 per side, four supports 42 per side, etc.

The plug portions 56 and the openings 59 have complimentary cross-sections that allow the supports 42 to be removably coupled to the filter screen 32. When the plug portion 44 is inserted into the opening 59, a friction-fit connection may be formed between the components or the plug portion 44 and/or portions of the filter screen 32 defining the opening 59 and/or the support 42 may include structures that form a snap-fit connection or a tongue-and-groove connection. However, other ways of coupling the support 42 and the filter screen 32 may prove suitable.

In the implementation shown, the openings 59 are rectangular and are positioned transverse to the direction of flow as generally indicated by arrow 62. However, the openings 59 can be orientated 90 degrees relative to the position shown in FIG. 2 such that the supports 42 extend along the direction of flow. Because the supports 42 engage the lower deck 30 or are otherwise disposed within a flow path above the lower deck 30, rotating the supports 42 ninety degrees relative to the orientation shown in FIG. 2 reduces obstructions to the flow of drilling fluid and/or debris on the lower deck 30. Additionally, while the openings 59 and the plug portions 60 are shown as being rectangular, the openings 59 and/or the plug portions 60 may be any other shape such as, for example, hexagonal, octagonal, and/or curvilinear shape.

Figure 3:
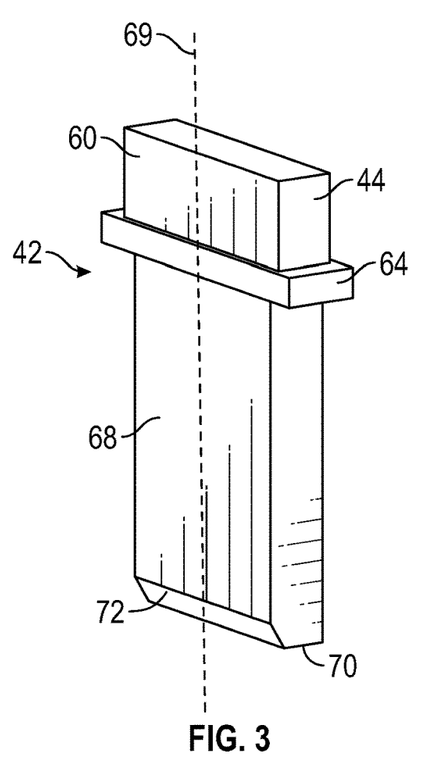
FIG. 3 illustrates an isometric view of a support that can be used with the separator of FIG. 1 and/or the upper deck assembly of FIG. 2.

FIG. 3 illustrates an isometric view of the support 42 that can be used with the separator 10 of FIG. 1 and/or the upper deck assembly 33 of FIG. 2. In the implementation shown, the support 42 includes the plug portion 60, a flange 64, and a stand portion 68 that extends downwardly from the plug portion 60.

The support 42 includes a support flange 64 that abuts the filter screen 32 when the plug portion 60 is fully inserted into the opening 59 of the filter screen 32 (see, for example, FIG. 2). The flange 64 extends around a perimeter of the support 42 and extends laterally outwardly from the support 42 generally transverse to a longitudinal axis 69. However, the flange 64 can alternatively extend from opposite sides of the support 42, such as lateral sides of the support 42 or upstream and downstream sides of the support 42. As set forth herein, the upstream side of the support 42 is configured to face the inlet end 12 of the separator 10 and the downstream side of the support 42 is configured to face the discharge end 14 of the separator 10.

Referring still to FIG. 3, the stand portion 68 of the support 42 has a lower surface 70 that is configured to engage the lower deck 30 or another support surface of the separator 10 and also includes a downstream chamfered or rounded surface 72 that allows the lower deck 30 to be installed within the separator 10 while the upper deck assembly 33 is installed within the separator 10. For example, the lower deck 30 can be installed within the separator 10 while the supports 42 of the upper deck assembly 33 downwardly extend and the chamfered surfaces 72 of the supports 42 face downstream by the lower deck 30 engaging the chamfered surface 72 of the supports 42 and urging the supports 42 and/or a portion of the upper deck assembly 33 upward or otherwise permitting the lower deck 30 to pass thereby. Thus, the filter screen(s) 32 of the lower deck 30 can be installed or removed from the separator 10 without having to uncouple the supports 42 from the upper deck assembly 33.

Figure 4:
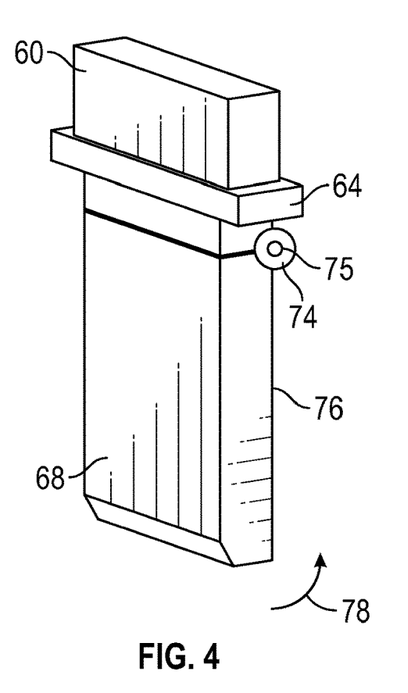
FIG. 4 illustrates an isometric view of another support in accordance with a second example of the present disclosure and that can be used with the separator of FIG. 1 and/or the upper deck assembly of FIG. 2.

FIG. 4 illustrates an isometric view of another support 42 in accordance with a second example of the present disclosure and that can be used with the separator 10 of FIG. 1 and/or the upper deck assembly 33 of FIG. 2. The support 42 of FIG. 4 is similar to the support 42 of FIG. 3. However, in contrast, the support 42 of FIG. 4 includes a hinge 74 coupling the plug portion 60 and the stand portion 68. Thus, the plug portion 60 and the stand portion 44 are separate components coupled by the hinge 74.

The hinge 74 includes a hinge pin 75 and is positioned on an upstream side 76 of the support 42 such that the stand portion 68 can rotate counterclockwise relative to the plug portion 60 and in a direction generally indicated by arrow 78. The hinged coupling between the plug portion 60 and the stand portion 44 enables the lower deck 30 to be easily installed while the upper deck assembly 33 and its supports 42 are also installed within the separator 10 in a similar manner as disclose above. Additionally, the flow of fluid across the lower deck 30 urges the stand portion 68 in a direction generally opposite that of the arrow 78.

While the plug portion 60 of the support 42 of FIG. 4 is shown separate from the filter screen 32, the plug portion 60 including half of the hinge 74 may be coupled to (e.g., integrally coupled) or otherwise provided with the filter screen 32 and the separate stand portion 68 may include the other half of the hinge 74. In such implementations, the filter screen 32 including the plug portion 60 may be used with the lower deck 30 and the filter screen 32 coupled to the stand portion 68 via the hinge pin 75 may be used with the upper deck 34.

Figure 5:
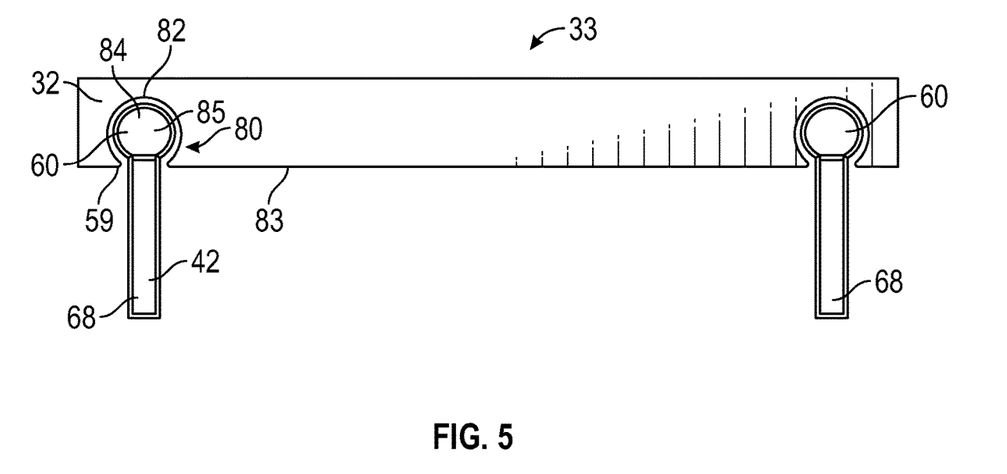
FIG. 5 illustrates a side view of a portion of another upper deck assembly in accordance with a third example of the present disclosure and that can be used with the separator of FIG. 1.

FIG. 5 illustrates a side view of a portion of another upper deck assembly 33 in accordance with a third example of the present disclosure and that can be used with the separator 10 of FIG. 1. The filter screen 32 and the support 42 of FIG. 5 are similar to the filter screen 32 and the support 42 of FIG. 2. However, in contrast, the filter screen 32 and the support 42 of FIG. 5 are coupled via a rotatable coupling 80. The filter screen 32 of FIG. 5 is versatile in that the filter screen 32 can be provided without the supports 42 when the filter screens 32 are used for the lower deck 30 of the separator 10 of FIG. 1 but these same filter screens 32 can be easily converted to be used with the upper deck assembly 33 by coupling the supports 42 thereto.

In the implementation shown, the rotatable coupling 80 is a ball-and-socket joint or a hinge joint. The downward extending opening 59 of the filter screen 32 is a socket 82 formed at a lower surface 83 of the filter screen 32 and the plug portion 60 of the support 42 is a ball 84 at a proximal end 85 of the support 42 that is received within the socket 82. The ball 84 may be coupled within the socket 82 via a snap-fit connection or a plate may be coupled to the lower surface 83 of the filter screen 32 that partially covers the opening 59 to retain the ball 84 within the opening 59 and couple the support 42 to the filter screen 32.

Figure 6:
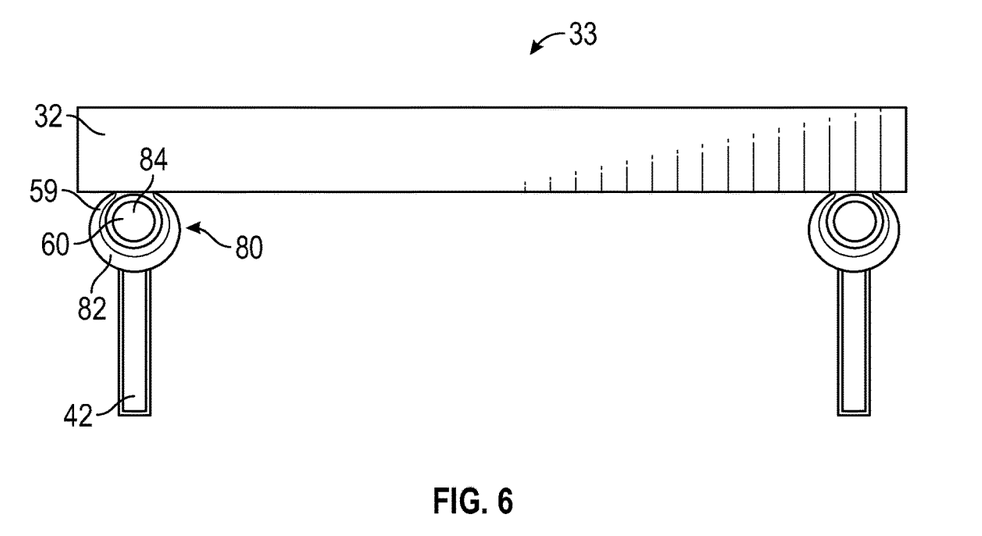
FIG. 6 illustrates a side view of a portion of another upper deck assembly in accordance with a fourth example of the present disclosure and that can be used with the separator of FIG. 1.

FIG. 6 illustrates a side view of a portion of another upper deck assembly 33 in accordance with a fourth example of the present disclosure and that can be used with the separator 10 of FIG. 1. The filter screen 32 and the support 42 of FIG. 6 are similar to the filter screen 32 and the support 42 of FIG. 5. However, in contrast, the rotatable coupling 80 between the filter screen 32 and the support 42 is reversed in that the filter screen 32 includes the ball 84 and the plug portion 60 of the support 42 forms the socket 82.

Figure 7:
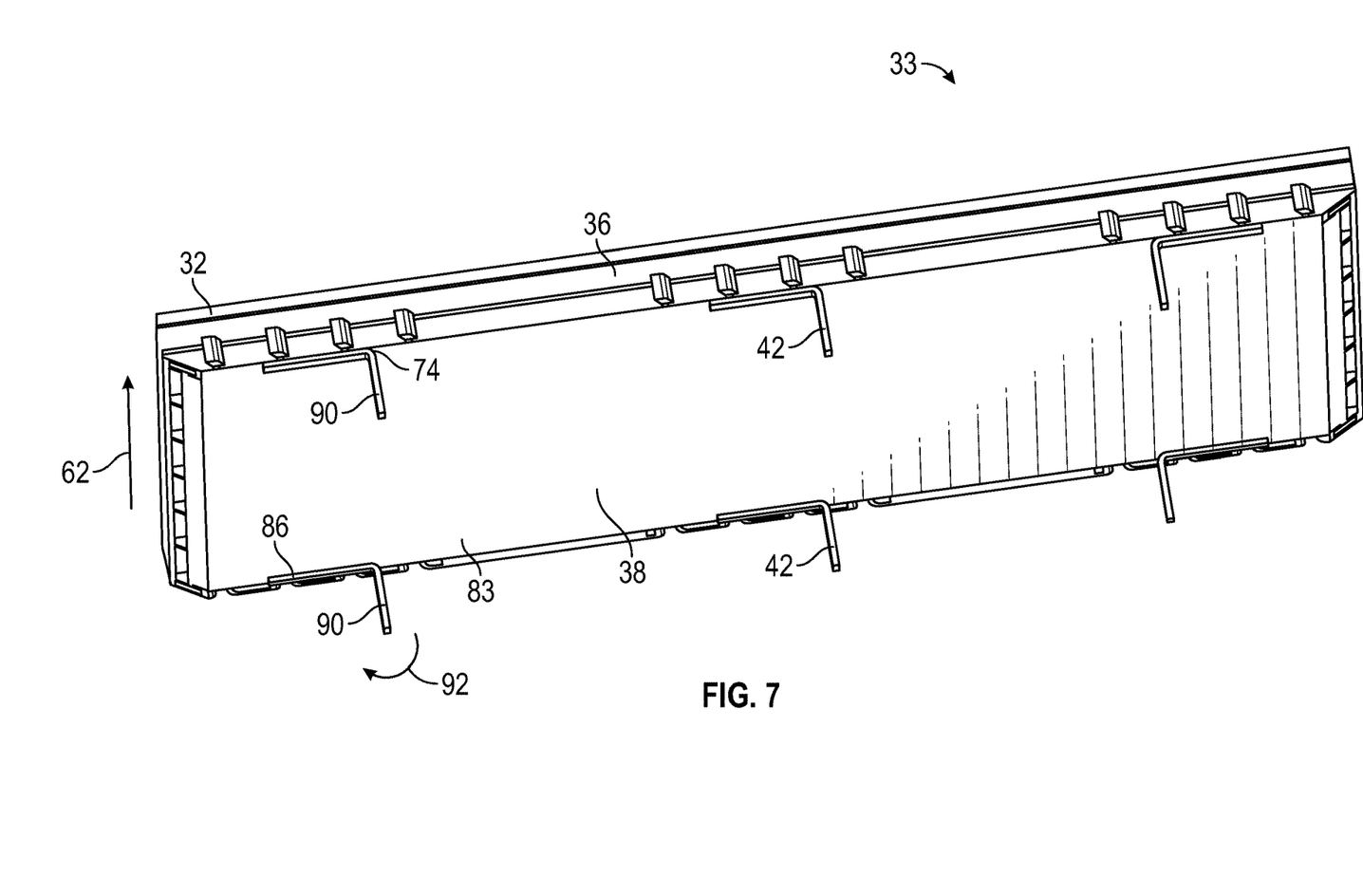
FIG. 7 illustrates a bottom isometric view of a portion of another upper deck assembly in accordance with a fifth example of the present disclosure and that can be used with the separator of FIG. 1.

FIG. 7 illustrates a bottom isometric view of a portion of another upper deck assembly 33 in accordance with a fifth example of the present disclosure and that can be used with the separator 10 of FIG. 1. In the example shown, the supports 42 have a thinner profile in the direction of flow as generally indicated by arrow 62 and, thus, have a lesser tendency to disrupt or adversely affect fluid flow on the lower deck 30. The supports 42 are L-shaped and include a first leg 86 coupled to the lower surface 83 of the filter screen 32 and a second leg 90 that extends downwardly from the first leg 86 and is arranged to engage the lower deck 30 or a support surface of the vibratory separator 10. The first leg 86 may include one or more plug portions 60 that are receivable within the openings 59 of the filter screen 32 or the support 42 may be coupled to the filter screen 32 in another way such as being integrally formed with the filter screen 32 or coupled to the filter screen 32 by welding. The first leg 86 may be fixed relative to the second leg 90 or the first leg 86 may be rotatable relative to the second leg 90. When the first leg 86 is rotatably coupled to the second leg 90, the hinge 74 is provided between the first and second legs 86, 90 and the second leg 90 can rotate clockwise toward the first leg 86 and in a direction generally indicated by arrow 92.

Figure 8:
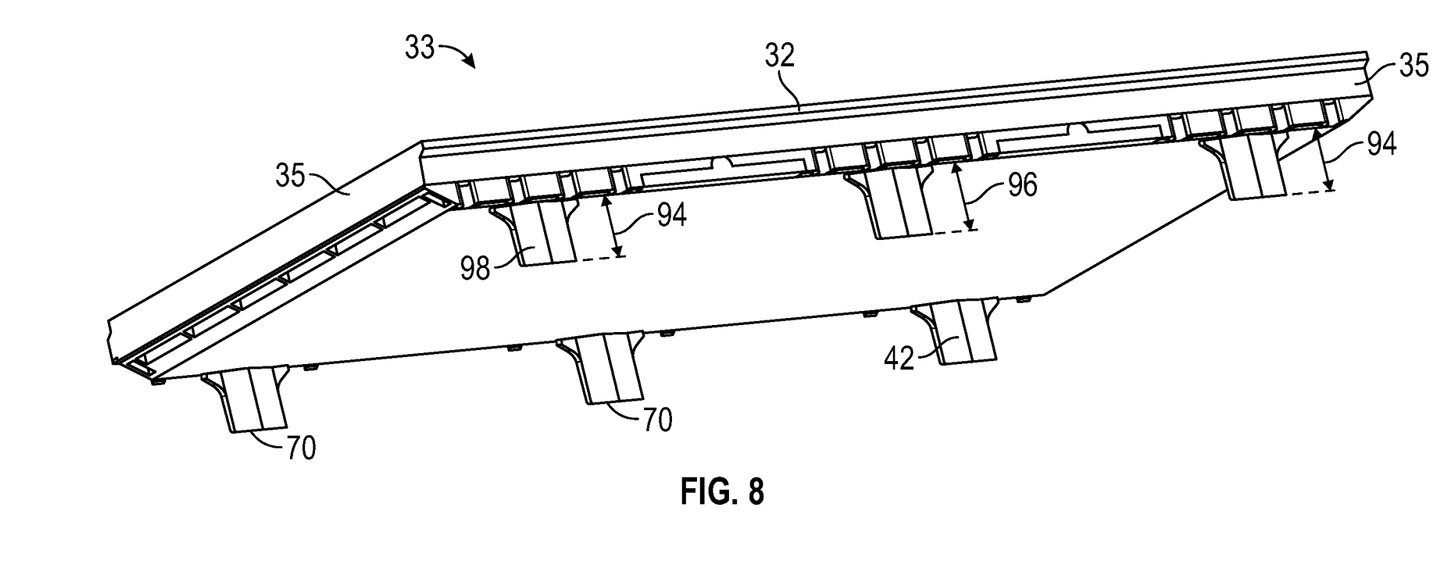
FIG. 8 illustrates an isometric bottom view of a portion of another upper deck assembly in accordance with a sixth example of the present disclosure and that can be used with the separator of FIG. 1.

FIG. 8 illustrates an isometric bottom view of a portion of another upper deck assembly 33 in accordance with a sixth example of the present disclosure and that can be used with the separator 10 of FIG. 1. The filter screen 32 and the supports 42 of FIG. 8 are similar to the filter screen 32 and the supports 42 of the FIG. 2. However, in contrast, the supports 42 of FIG. 8 are integrally formed with the filter screen 32 and the filter screen 32 of FIG. 8 is adapted to form a crowned configuration when installed within the separator 10. As such, the supports 42 of FIG. 8 have different height values that urge the filter screen 32 to form the crown when the supports 42 engage the support surface of the vibratory separator 10 below and the lower surfaces 70 of the supports 42 are planar relative to one another. In the implementation shown, the supports 42 on the sides 35 of the filter screen 32 have a different height value 94 than the height 96 of the support 42 positioned in the middle of the filter screen 32. However, the supports 42 may be different heights to achieve or accommodate different crown configurations. Moreover, the filter screen 32 itself may be formed with a concave or convex profile to further provide a desired profile. While the supports 42 of FIG. 8 are disclosed as forming a crown configuration, any of the supports 42 disclosed herein may be adapted to form a crown configuration when installed in the separator 10.

Referring still to the supports 42 of FIG. 8, in the implementation shown, the supports 42 have a chamfered or otherwise contoured rear surface 98 that faces upstream and encourages fluid flowing on the lower deck 30 to flow around the supports 42. As disclosed above, the supports 42 of the FIG. 8 may be integral with the filter screen 32. As such, the supports 42 and/or the filter screens 32 may be injection molded and/or include a composite material, glass-reinforced plastic materials such as a polypropylene material reinforced with fiber glass, and/or a steel-rod structure. If the support 42 includes a steel rod structure, the steel rod structure may be coupled (e.g., welded) to a steel rod structure of the filter screen 32 and/or over molded.

Figure 9:
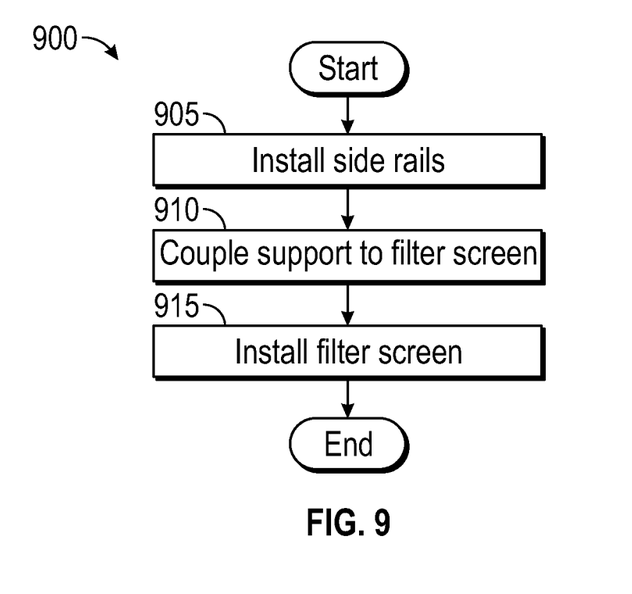
FIG. 9 is a flowchart representative of an example method for assembling a vibratory separator, in accordance with the teachings of this disclosure.

A flowchart 900 representative of example processes and/or methods for assembling a vibratory separator, in accordance with aspects of this disclosure, is shown in FIG. 9. Although an example method is described with reference to the flowchart 900 illustrated in FIG. 9, many other methods of assembling a vibratory separator may alternatively be used. For example, the order of execution of the blocks may be changed, and/or some of the blocks described may be changed, eliminated, or combined.

The example method of FIG. 9 begins with one or more inward extending side rails 39 being coupled to respective inward facing surfaces 40 of the basket 20 of a vibratory separator 10 (block 905). One or more supports 42 are coupled to the filter screen 32 (block 910). To do so, the upper plug portion 44 of the support 42 can be inserted into a corresponding opening 59 in the filter screen 32. In some implementations, the support 32 can be coupled to the filter screen 32 with a ball-and-socket joint (see, FIG. 6). In other implementations, the support 42 is integrally formed with the filter screen 32 (FIG. 8) and, thus, coupled when the filter screen 32 is manufactured. The filter screen 32 is installed in the basket 20 such that one or more edges of the filter screen 32 engage respective ones of the one or more side rails 39 and the support 42 engages a lower deck 30 or a support surface of the vibratory separator 10 to provide support for the filter screen 32 across a width of the filter screen 32. For example, using a hinge 74 to unfold the support 42 from a folded position prior to or during installation of the filter screen in the basket.

In accordance with a first implementation, an upper deck assembly for use with a vibratory separator having a basket and a lower deck. The upper deck assembly includes a pair of side rails couplable to inward facing surfaces of the basket, a filter screen supportable by the side rails, and a support extending from the filter screen and configured to engage the lower deck or a support surface of the vibratory separator and provide support for the filter screen across a width thereof.

The apparatus of any one or more of the preceding implementations and/or any one or more of the implementations disclosed below, the filter screen defines a downwardly extending opening and wherein the support includes an upper plug portion insertable into a corresponding opening in the filter screen.

The apparatus of any one or more of the preceding implementations and/or any one or more of the implementations disclosed below, the support includes a support flange configured to abut the filter screen.

The apparatus of any one or more of the preceding implementations and/or any one or more of the implementations disclosed below, the support flange extends around a perimeter of support.

The apparatus of any one or more of the preceding implementations and/or any one or more of the implementations disclosed below, the support includes the upper plug portion and a stand portion and the upper plug portion is hingeably coupled to the stand portion.

The apparatus of any one or more of the preceding implementations and/or any one or more of the implementations disclosed below, the upper deck assembly further includes a hinge formed between the support and the filter screen.

The apparatus of any one or more of the preceding implementations and/or any one or more of the implementations disclosed below, the hinge includes a ball-and-socket joint.

The apparatus of any one or more of the preceding implementations and/or any one or more of the implementations disclosed below, the support has a proximal end including a ball of the ball-and-socket joint and a lower surface of the filter screen includes a corresponding socket of the ball-and-socket joint.

The apparatus of any one or more of the preceding implementations and/or any one or more of the implementations disclosed below, the support has a proximal end including a socket of the ball-and-socket joint and a lower surface of the filter screen includes a corresponding ball of the ball-and-socket joint.

The apparatus of any one or more of the preceding implementations and/or any one or more of the implementations disclosed below, a downstream surface of the stand portion has a chamfer.

The apparatus of any one or more of the preceding implementations and/or any one or more of the implementations disclosed below, the support has a height to accommodate a crown of the filter screen.

The apparatus of any one or more of the preceding implementations and/or any one or more of the implementations disclosed below, the support is integrally formed with the filter screen.

In accordance with a second implementation, an upper deck assembly for use with a vibratory separator having a basket and a lower deck. The upper deck assembly including a filter screen and a support coupled or couplable to the filter screen and configured to engage the lower deck or a support surface of the vibratory separator and provide support for the filter screen across a width thereof.

The apparatus of any one or more of the preceding implementations and/or any one or more of the implementations disclosed below, further including a hinge pin to couple the support to the filter screen.

The apparatus of any one or more of the preceding implementations and/or any one or more of the implementations disclosed below, a rotatable coupling is formed between the hinge pin and the filter screen.

The apparatus of any one or more of the preceding implementations and/or any one or more of the implementations disclosed below, the filter screen defines one or more downward extending cavities and the support is couplable to the filter screen by inserting the support within the corresponding opening.

The apparatus of any one or more of the preceding implementations and/or any one or more of the implementations disclosed below, the support has a chamfered rear surface.

The apparatus of any one or more of the preceding implementations and/or any one or more of the implementations disclosed below, the filter screen and the support are integral.

The apparatus of any one or more of the preceding implementations and/or any one or more of the implementations disclosed below, the support is removably coupled to the filter screen.

In accordance with a third implementation, a method for adding an upper deck assembly to a vibratory separator includes installing an inward extending side rail to an inward facing surface of a basket of the vibratory separator, coupling a support to a filter screen, and installing the filter screen in the basket such that an edge of the filter screen engages the side rail. The support engages a lower deck or a support surface of the vibratory separator to provide support for the filter screen across a width of the filter screen.

The apparatus of any one or more of the preceding implementations and/or any one or more of the implementations disclosed below, coupling the support to the filter screen includes inserting an upper plug portion of the support into a downwardly extending opening defined in the filter screen.

The apparatus of any one or more of the preceding implementations and/or any one or more of the implementations disclosed below, installing the filter screen in the basket includes unfolding the support.

The apparatus of any one or more of the preceding implementations and/or any one or more of the implementations disclosed below, coupling the support to the filter screen includes coupling the support and the filter screen with a ball-and-socket joint.

The apparatus of any one or more of the preceding implementations and/or any one or more of the implementations disclosed below, the support is integrally formed with the filter screen, and the support and filter screen are coupled during manufacture.

In accordance with a fourth implementation, an upper deck assembly for use with a vibratory separator having a basket and a lower deck, the upper deck assembly includes a pair of side rails, one or more filter screens, and a plurality of supports. The side rails are couplable to inward facing surfaces of the basket and the one or more filter screens are supportable by the side rails. The supports extend from the one or more filter screens and are configured to engage the lower deck or a support surface of the vibratory separator and provide support for the one or more filter screens across a width thereof.

In accordance with a fifth implementation, an upper deck assembly for use with a vibratory separator having a basket and a lower deck, the upper deck filter screen assembly includes one or more filter screens and a plurality of supports coupled or couplable to the one or more filter screens and configured to engage the lower deck or a support surface of the vibratory separator and provide support for the one or more filter screens across a width thereof.

In accordance with a sixth implementation, a filter screen support apparatus for a shaker having an upper deck and a lower deck, the filter screen support apparatus includes a plurality of support members each having a body including an upper plug portion, a support flange, and a stand portion. The upper plug portion is configured to be inserted into an opening in a filter screen of the upper deck of the shaker and the support flange extends laterally outwardly adjacent to the upper plug portion. The support flange has an upper surface configured to abut the filter screen of the upper deck. The stand portion extends downwardly from the upper plug portion and has a bottom surface A height of the body between the upper surface of the support flange and the bottom surface of the stand portion is configured to extend to a support surface of the shaker to thereby provide support for the filter screen of the upper deck.

In accordance with a seventh implementation, a shaker includes a base, a basket, a lower deck, an upper deck, and a plurality of support members. The basket is coupled to the base and includes sidewalls and a cross-frame. The lower deck is coupled to the basket and has one or more filter screens. The upper deck is coupled to the basket and has one or more filter screens. The one or more filter screens each include a frame having a plurality of downwardly oriented openings. Each of the support members has a body including an upper plug portion, a support flange, and a stand portion. The upper plug portion is configured to be inserted into one of the openings of the frame of one of the one or more filter screens of the upper deck. The support flange of the body extends laterally outwardly adjacent to the upper plug portion. The support flange has an upper surface configured to abut the frame around the one of the openings of the frame. The stand portion extends downwardly from the upper plug portion and has a bottom surface. A height of the body between the upper surface of the support flange and the bottom surface of the stand portion is configured to extend to a support surface of one of the lower deck or the basket to thereby provide support for the screen of the upper deck.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. An upper deck assembly for use with a vibratory separator having a basket and a lower deck, the upper deck assembly comprising:
a pair of side rails couplable to inward facing surfaces of the basket;
a filter screen supportable by the side rails; and
a support extending from the filter screen and configured to engage the lower deck or a support surface of the vibratory separator and provide support for the filter screen across a width thereof.

2. The upper deck assembly of claim 1, wherein the filter screen defines a downwardly extending opening and wherein the support comprises an upper plug portion insertable into a corresponding opening in the filter screen.

3. The upper deck assembly of claim 2, wherein the support comprises a support flange configured to abut the filter screen.

4. The upper deck assembly of claim 3, wherein the support flange extends around a perimeter of support.

5. The upper deck assembly of claim 2, wherein the support comprises the upper plug portion and a stand portion, and wherein the upper plug portion is hingeably coupled to the stand portion.

6. The upper deck assembly of claim 1, further comprising a hinge formed between the support and the filter screen.

7. The upper deck assembly of claim 6, wherein the hinge comprises a ball-and-socket joint.

8. The upper deck assembly of claim 7, wherein the support has a proximal end including a ball of the ball-and-socket joint, and wherein a lower surface of the filter screen includes a corresponding socket of the ball-and-socket joint.

9. The upper deck assembly of claim 7, wherein the support has a proximal end including a socket of the ball-and-socket joint, and wherein a lower surface of the filter screen includes a corresponding ball of the ball-and-socket joint.

10. The upper deck assembly of claim 1, wherein a downstream surface of the stand portion has a chamfer.

11. The upper deck assembly of claim 1, wherein the support has a height to accommodate a crown of the filter screen.

12. The upper deck assembly of claim 1, wherein the support is integrally formed with the filter screen.

13. An upper deck assembly for use with a vibratory separator having a basket and a lower deck, the upper deck assembly comprising:
a filter screen; and
a support coupled or couplable to the filter screen and configured to engage the lower deck or a support surface of the vibratory separator and provide support for the filter screen across a width thereof.

14. The upper deck assembly of claim 13, further comprising a hinge pin to couple the support to the filter screen.

15. The upper deck assembly of claim 14, wherein a rotatable coupling is formed between the hinge pin and the filter screen.

16. The upper deck assembly of claim 13, wherein the filter screen defines one or more downward extending cavities and the support is couplable to the filter screen by inserting the support within a corresponding opening.

17. The upper deck assembly of claim 13, wherein the support has a chamfered rear surface.

18. The upper deck assembly of claim 13, wherein the filter screen and the support are integral.

19. The upper deck assembly of claim 13, wherein the support is removably coupled to the filter screen.

20. A method for adding an upper deck assembly to a vibratory separator, the method comprising:
installing an inward extending side rail to an inward facing surface of a basket of the vibratory separator;
coupling a support to a filter screen; and
installing the filter screen in the basket such that an edge of the filter screen engages the side rail, and the support engages a lower deck or a support surface of the vibratory separator to provide support for the filter screen across a width of the filter screen.

21. The method of claim 20, wherein coupling the support to the filter screen includes inserting an upper plug portion of the support into a downwardly extending opening defined in the filter screen.

22. The method of claim 20, wherein installing the filter screen in the basket includes unfolding the support.

23. The method of claim 20, wherein coupling the support to the filter screen includes coupling the support and the filter screen with a ball-and-socket joint.

24. The method of claim 20, wherein the support is integrally formed with the filter screen, and the support and filter screen are coupled during manufacture.

* * * * *